United States Patent
Kawashima

(10) Patent No.: US 10,649,257 B2
(45) Date of Patent: May 12, 2020

(54) COVER MOUNTING STRUCTURE AND DISPLAY DEVICE

(71) Applicant: SHARP KABUSHIKI KAISHA, Sakai, Osaka (JP)

(72) Inventor: Hirokazu Kawashima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 130 days.

(21) Appl. No.: 15/913,635

(22) Filed: Mar. 6, 2018

(65) Prior Publication Data

US 2018/0275447 A1    Sep. 27, 2018

(30) Foreign Application Priority Data

Mar. 22, 2017    (JP) .................................. 2017-055499

(51) Int. Cl.
    *G02F 1/1333*    (2006.01)

(52) U.S. Cl.
    CPC .................. *G02F 1/133308* (2013.01); *G02F 2001/133314* (2013.01); *G02F 2001/133325* (2013.01)

(58) Field of Classification Search
    CPC ... G02F 1/133308; G02F 2001/133314; G02F 2001/133325
    See application file for complete search history.

(56) References Cited

U.S. PATENT DOCUMENTS

| 7,269,023 | B2 | 9/2007 | Nagano | |
|---|---|---|---|---|
| 8,245,992 | B2* | 8/2012 | Matsui | F16M 13/02 248/224.51 |
| 8,325,471 | B2* | 12/2012 | Yokota | H05K 7/20963 312/223.1 |
| 8,405,960 | B2* | 3/2013 | Ishizu | F16M 11/10 348/794 |
| 2004/0232298 | A1* | 11/2004 | Bremmon | F16M 11/10 248/281.11 |
| 2006/0018092 | A1 | 1/2006 | Nagano | |
| 2013/0242480 | A1* | 9/2013 | Kim | H05K 7/14 361/679.01 |
| 2014/0166834 | A1* | 6/2014 | Kuroyanagi | F16M 13/02 248/231.91 |
| 2016/0309599 | A1* | 10/2016 | Kikuchi | G09F 9/33 |

FOREIGN PATENT DOCUMENTS

JP    2006-053529 A    2/2006

* cited by examiner

*Primary Examiner* — Abhishek M Rathod
(74) *Attorney, Agent, or Firm* — ScienBiziP, P.C.

(57) ABSTRACT

A cover mounting structure is configured to mount a cover to a covering target to be covered with the cover. The cover mounting structure includes a support member and a sliding member. The support member is configured to be secured to the covering target and supports the cover. The sliding member is prepared separately from the cover and provided so as to be slidable relative to the support member. The cover is secured to the support member at a prescribed securing position and connected to the sliding member at a different position from the prescribed securing position.

4 Claims, 10 Drawing Sheets

COVER MOUNTING STRUCTURE AND DISPLAY DEVICE

BACKGROUND

1. Field

The present disclosure relates to a cover mounting technique.

2. Description of the Related Art

In many cases with display devices such as liquid crystal displays, a cover formed of resin is mounted on the rear surface of a display panel (module) so as to cover a control board and the like provided on the rear surface of a display panel. In the related art, such a cover is secured to the rear surface of the display panel with fastening members such as screws at plurality of positions of the cover (see, for example, Japanese Unexamined Patent Application Publication No. 2006-53529).

SUMMARY

However, the resin cover is likely to expand or contract due to heat or with time. Accordingly, due to the expansion or contraction, stress that tends to increase or reduce the distance between two secured points is caused in the cover secured to the rear surface of the display panel. In addition, during a process in which the stress is caused, deformation such as warpage is likely to be caused in the cover. Such deformation of the cover may not only lead to damage to the cover itself but also cause deformation such as warpage in the display panel, and further, reduce basic performance of the display panel.

It is desirable to provide a cover mounting structure and a display device in which stress due to expansion or contraction is unlikely to be caused in a cover.

According to an aspect of the disclosure, there is provided a cover mounting structure. The cover mounting structure is configured to mount a cover to a covering target to be covered with the cover. The cover mounting structure includes a support member and a sliding member. The support member is configured to be secured to the covering target and supports the cover. The sliding member is prepared separately from the cover and provided so as to be slidable relative to the support member. The cover is secured to the support member at a prescribed securing position and connected to the sliding member at a different position from the prescribed securing position.

According to another aspect of the present disclosure, there is provided a display device that includes a display panel, a cover that covers a rear surface of the display panel, and the above-described cover mounting structure used for mounting of the cover on the rear surface of the display panel.

DESCRIPTION OF THE EMBODIMENTS

Figure 1A:
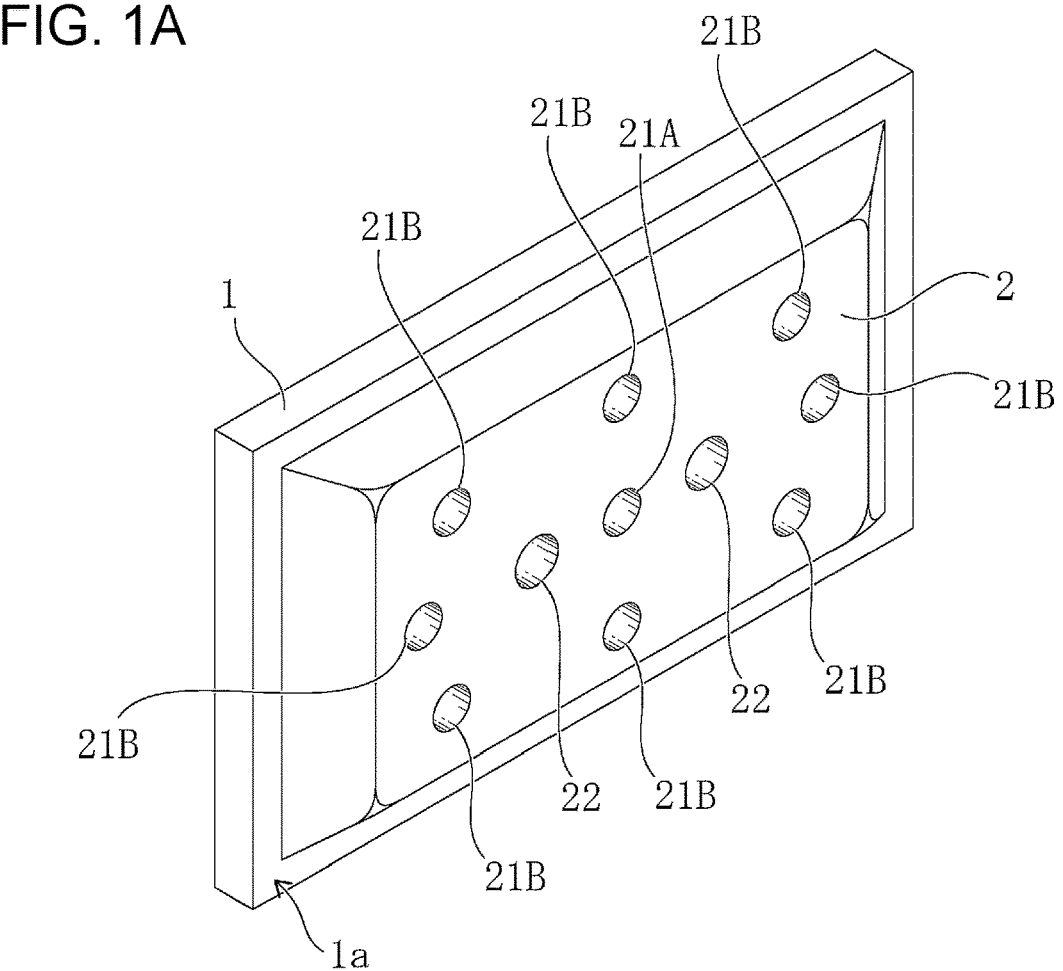
FIGS. 1A and 1B are respectively a perspective view and a rear view of a display device serving as an example for which a cover mounting structure according to the present disclosure is used.
Figure 1B:
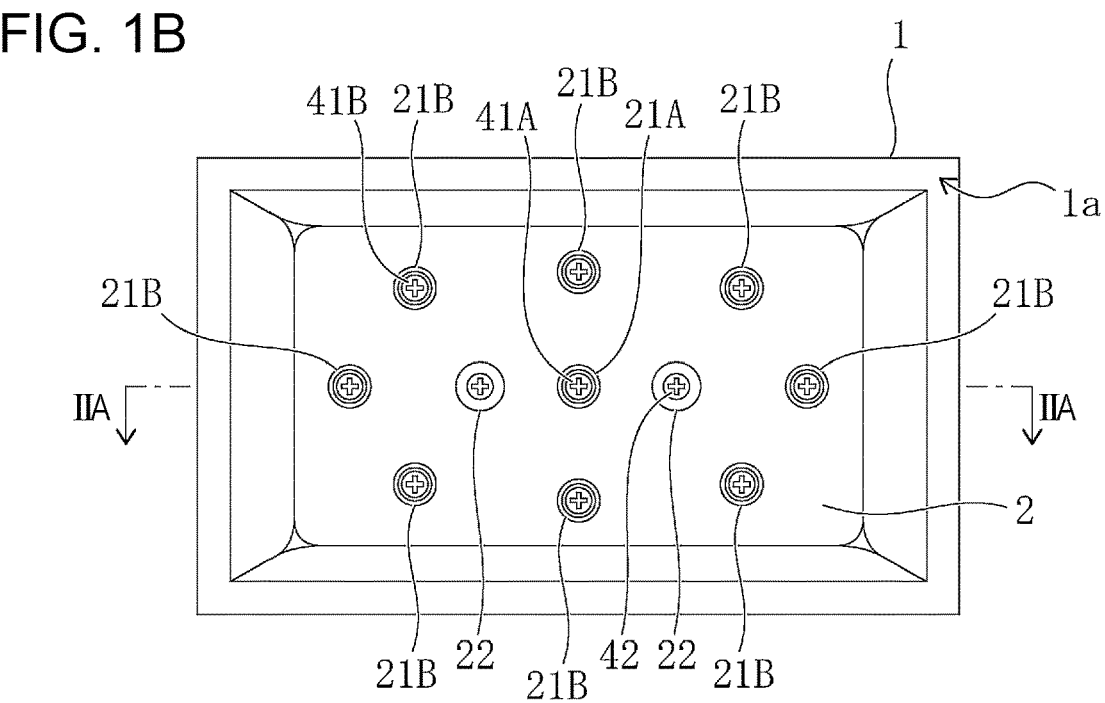

FIGS. 1A and 1B are respectively a perspective view and a rear view of a display device serving as an example for which a cover mounting structure according to the present disclosure is used. Here, the display device is, for example, a liquid crystal display. It is noted that the cover mounting structure according to the present disclosure is usable not only for a liquid crystal display but also for any one of various display devices, and further, used for mounting of a cover to a covering target in any one of various devices other than a display device.

As illustrated in FIGS. 1A and 1B, the display device includes a display panel 1 and a cover 2 that covers a rear surface 1a of the display panel 1. The cover 2 is formed of resin. The cover 2 is mounted on the rear surface 1a of the display panel 1 with a cover mounting structure 3 (see, for example, FIG. 2A), which will be described later. Thus, a control board and so forth (not illustrated) provided on the rear surface 1a are covered by the cover 2. The material of the cover 2 is not limited to resin. The cover 2 may be formed of a material other than resin.

According to an embodiment, the cover 2 has a depression 21A provided at a single position in a central region, depressions 21B provided at eight positions in an outer peripheral region, and through portions 22 provided at two positions, that is, on the left side and on the right side of the central region. Here, the depression 21A is to be in proximity to or in contact with a support member 31, which will be described later, when the cover 2 is secured to the support member 31. Each of the depressions 21B is to be in proximity to or in contact with a corresponding one of sliding members 32, which will be described later, when the cover 2 is connected to the sliding members 32. The through portions 22 are used when securing the support member 31 to the rear surface 1a of the display panel 1.

Hereafter, embodiments of the cover mounting structure according to the present disclosure are specifically described.

[1] First Embodiment

[1-1] The Cover Mounting Structure

Figure 2A:
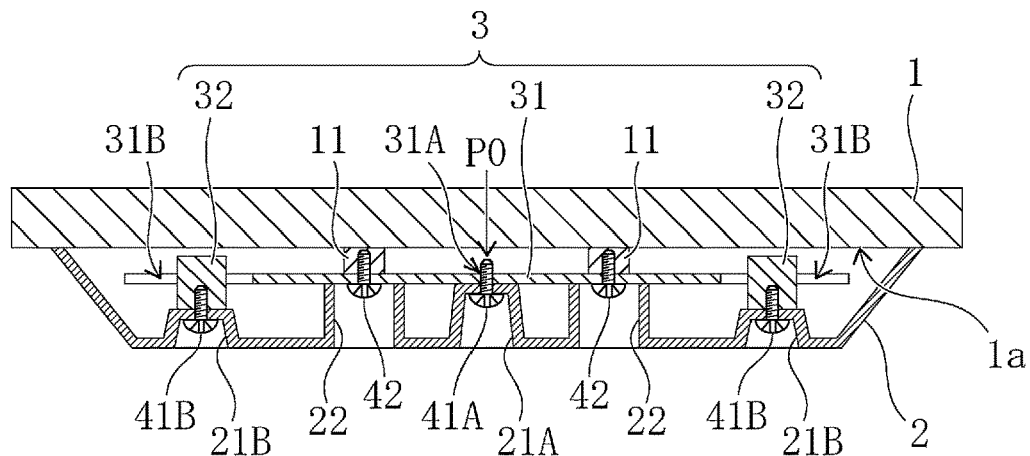
FIG. 2A is a sectional view of the cover mounting structure according to a first embodiment.
Figure 2B:
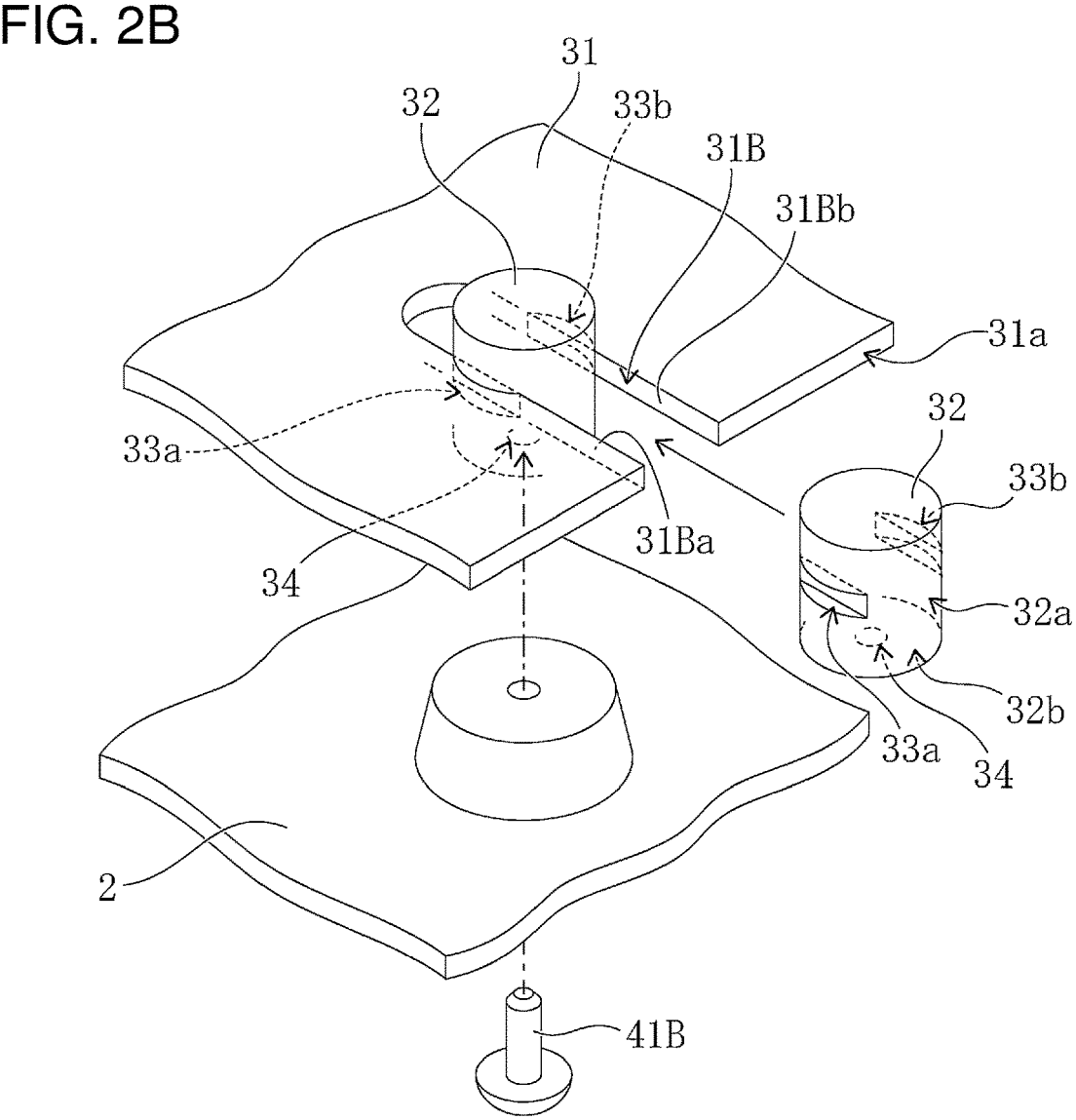
FIG. 2B is an exploded perspective view of part of the cover mounting structure.
Figure 3:
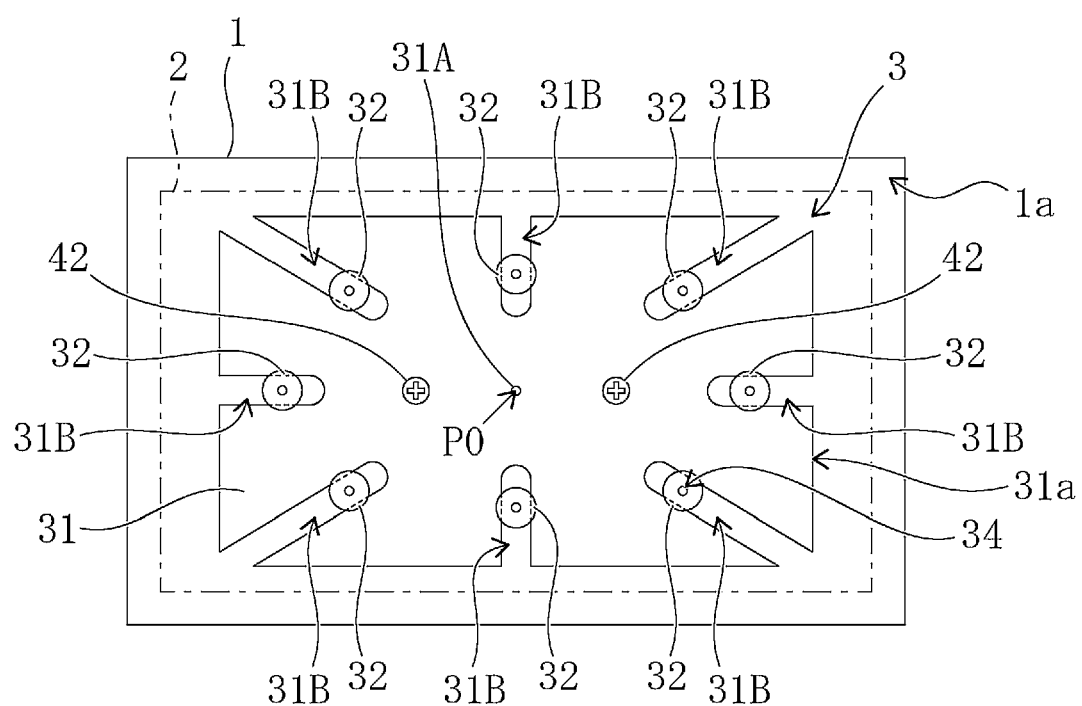
FIG. 3 is a rear view of the display device with the cover omitted, illustrating the cover mounting structure according to the first embodiment.

FIG. 2A is a sectional view of the cover mounting structure 3 according to a first embodiment, and FIG. 2B is an exploded perspective view of part of the cover mounting structure 3. FIG. 3 is a rear view of the display device with the cover 2 omitted. FIG. 2A is a sectional view taken along line IIA-IIA illustrated in FIG. 1B. As illustrated in FIGS. 2A to 3, the cover mounting structure 3 includes the support member 31 that supports the cover 2 and the sliding members 32 provided so as to be slidable relative to the support member 31. Both the support member 31 and the sliding members 32 are prepared separately from the cover 2. According to the present embodiment, eight of the sliding members 32 are provided for the support member 31 (see FIG. 3).

The support member 31 is a flat metal plate such as, for example, a metal sheet and secured to the rear surface 1a of the display panel 1 serving as the covering target. Specifically, the display panel 1 has two bosses 11 projecting on the rear surface 1a thereof, and support member 31 is secured to the bosses 11 with screw members 42 (see FIG. 2A). Fastening members that secure the support member 31 to the display panel 1 are not limited to the screw members 42. The support member 31 may be secured to the display panel 1 with fastening members other than the screw members 42.

With the support member 31 formed of metal as described above, expansion or contraction due to heat or with time is unlikely to occur in the support member 31 unlike the cover 2. Accordingly, even when the support member 31 is secured to the rear surface 1a of the display panel 1, there is a low probability that forces to cause deformation such as warpage are applied to the display panel 1. The material of the support member 31 is not limited to metal. The support member 31 may be formed of any one of a variety of materials that are unlikely to expand or contract.

A prescribed securing position P0, at which the cover 2 is secured with a screw member 41A, is set in the support member 31. Specifically, a screw hole 31A, into which the screw member 41A is screwed, is formed in the support member 31, and the securing position P0 is defined by the screw hole 31A. According to the present embodiment, the support member 31 is a rectangular flat plate and has a single screw hole 31A at the center (see FIG. 3). A fastening member that secures the support member 31 to the cover 2 is not limited to the screw member 41A. The support member 31 may be secured to the cover 2 with a fastening member other than the screw member 41A.

Furthermore, the support member 31 may have guide slits 31B that define moving directions D1 of the respective sliding members 32. Each of the guide slits 31B may have a pair of edges 31Ba and 31Bb that extend in a corresponding one of the sliding-member-32 moving directions D1. The guide slit 31B is provided at a different position from the position of the securing position P0. According to the present embodiment, eight guide slits 31B may be provided in the outer peripheral region of the support member 31. More specifically, the guide slits 31B face the respective depressions 21B when the cover 2 is secured to the support member 31 at the securing position P0.

The guide slits 31B define the sliding-member-32 moving directions D1 as expansion-contraction directions of the cover 2 (according to the present embodiment, directions in which the depressions 21B are moved when the cover 2 expands or contracts). Specifically, the guide slits 31B may define the sliding-member-32 moving directions D1 as radial directions from the securing position P0 as the center. Accordingly, the eight guide slits 31B may radially extend from the securing position P0 as the center according to the present embodiment.

The sliding members 32 are slidably engaged with the guide slits 31B (see FIG. 2B). According to the present embodiment, each of the sliding members 32 is slidably engaged with a corresponding one of eight guide slits 31B. Furthermore, the sliding member 32 has a columnar shape having a larger width than the width of the guide slit 31B. The sliding member 32 may have a pair of cuts 33a and 33b in a circumferential surface 32a thereof. Here, the pair of cuts 33a and 33b may be slidably engaged with the respective edges 31Ba and 31Bb of the guide slit 31B. Furthermore, a screw hole 34 is formed in an end surface 32b on the cover 2 side of the sliding member 32. A screw member 41B is screwed into the screw hole 34 when the cover 2 is connected to the sliding member 32.

A fastening member that connects the sliding member 32 to the cover 2 is not limited to the screw member 41B. The sliding member 32 may be connected to the cover 2 with a fastening member other than the screw member 41B.

According to the present embodiment, one end of each of the guide slits 31B is open at an outer periphery 31a of the support member 31. Accordingly, as illustrated in FIG. 2B, each of the sliding members 32 can be inserted into a corresponding one of the guide slits 31B from the outer periphery 31a side of the support member 31.

The cover 2 is secured to the support member 31 at the securing position P0 and connected to the sliding members 32 at different positions from the securing position P0. Thus, the cover 2 is mounted on the rear surface 1a of the display panel 1 with the cover mounting structure 3 interposed therebetween.

Specifically, first, the cover 2 is secured to the support member 31 at the securing position P0 with the screw member 41A. Next, the sliding members 32 are inserted into the guide slits 31B, and after that, the cover 2 (depressions 21B) and the sliding members 32 are connected to each other with the screw members 41B. At this time, rotation (rotation about their axes) of the sliding members 32 having inserted into the guide slits 31B, the rotation being performed about the central axis of each of the sliding members 32, is suppressed by fitting of the edges 31Ba and 31Bb of the guide slits 31B into the cuts 33a and 33b. Accordingly, the sliding members 32 do not rotate (do not rotate about their axes) when the screw members 41B are screwed into the screw holes 34. That is, the cuts 33a and 33b and the edges 31Ba and 31Bb are engaged with one another so as to function as rotation stoppers for the sliding members 32. Then, the support member 31 is secured to the rear surface 1a (two bosses 11 according to the present embodiment) of the display panel 1 with the screw members 42 from a rear surface side of the cover 2 through the through portions 22. According to the present embodiment, the through portions 22 each have a cylindrical shape extending to a position where the through portion 22 is in proximity to or in contact with the support member 31.

With the above-described cover mounting structure 3, when the cover 2 expands or contracts due to heat or with time, the sliding members 32 connected to the cover 2 are able to be moved along the guide slits 31B in directions in accordance with the expansion or contraction of the cover 2. Specifically, the cover 2 secured at the securing position P0 expands or contracts around the securing position P0 at the center. Thus, according to the present embodiment, the guide slits 31B define the sliding-member-32 moving directions D1 as radial directions from the securing position P0 as the center. Accordingly, the sliding-member-32 moving directions D1 are coincident with the cover-2 expansion-contraction directions. This allows the sliding members 32 to be smoothly moved along the guide slits 31B when the cover 2 expands or contracts. Accordingly, stress due to expansion or contraction is unlikely to be caused in the cover 2. As a result, deformation such as warpage is unlikely to be caused in the cover 2.

Furthermore, with the above-described cover mounting structure 3, the cover 2 is mounted on the rear surface 1a of the display panel 1 with the plurality of sliding members 32 interposed therebetween. Thus, the strength with which the cover 2 is mounted is increased. Furthermore, the plurality of guide slits 31B radially extend from the securing position P0 as the center. In this case, all the sliding members 32 are able to be smoothly moved along the guide slits 31B when the cover 2 expands or contracts.

Furthermore, with the above-described cover mounting structure 3, the sliding members 32, which are prepared separately from the cover 2, are able to be formed separately from the cover 2 before the assembly of the display device. Furthermore, the cover mounting structure 3 is able to be made by simple tasks such as insertion of the sliding members 32 into the guide slits 31B and mounting of the cover 2 on the support member 31 and the sliding members 32 with the screw members.

[1-2] Modifications

Figure 4:
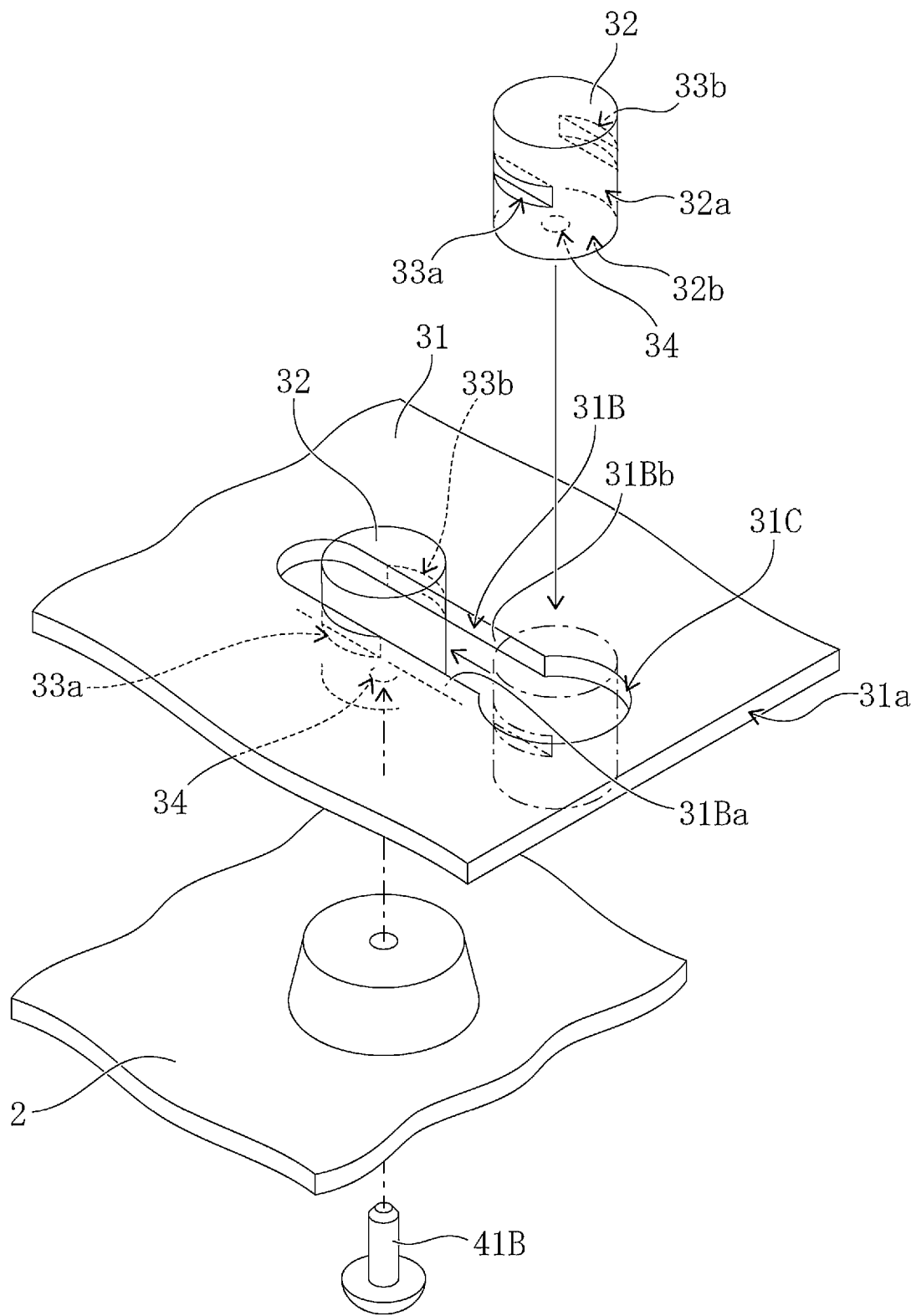
FIG. 4 is an exploded perspective view of a modification of the cover mounting structure according to the first embodiment.

FIG. 4 is an exploded perspective view of a modification of the cover mounting structure 3 according to the first embodiment. As illustrated in FIG. 4, the shape of the guide slits 31B is not limited to such a shape that one end of each of the guide slits 31B is open at the outer periphery 31a of the support member 31. The guide slit 31B may be closed at both ends thereof. In this case, the support member 31 has insertion holes 31C. Each of the insertion holes 31C is connected to a corresponding one of the guide slits 31B. Here, the insertion hole 31C allows a corresponding one of the sliding members 32 to be inserted, perpendicularly to the support member 31, through the insertion hole 31C in the same orientation as the orientation when the sliding member 32 is inserted into the guide slit 31B.

In order to insert the sliding member 32 into the guide slits 31B during the assembly of the display device, first, the sliding member 32 is inserted through the insertion hole 31C, thereby the cuts 33a and 33b are disposed at positions on lines extending from the pair of edges 31Ba and 31Bb. After that, the sliding member 32 is moved toward the guide slit 31B so as to bring the cuts 33a and 33b into engagement with the edges 31Ba and 31Bb.

According to the present modification (FIG. 4), even when the area of the support member 31 is increased due to an increase in the size of the display panel 1, the guide slits 31B are able to be provided not only in the outer peripheral region near the outer periphery 31a of the support member 31 but also at various positions including positions in the central region.

Figure 5:
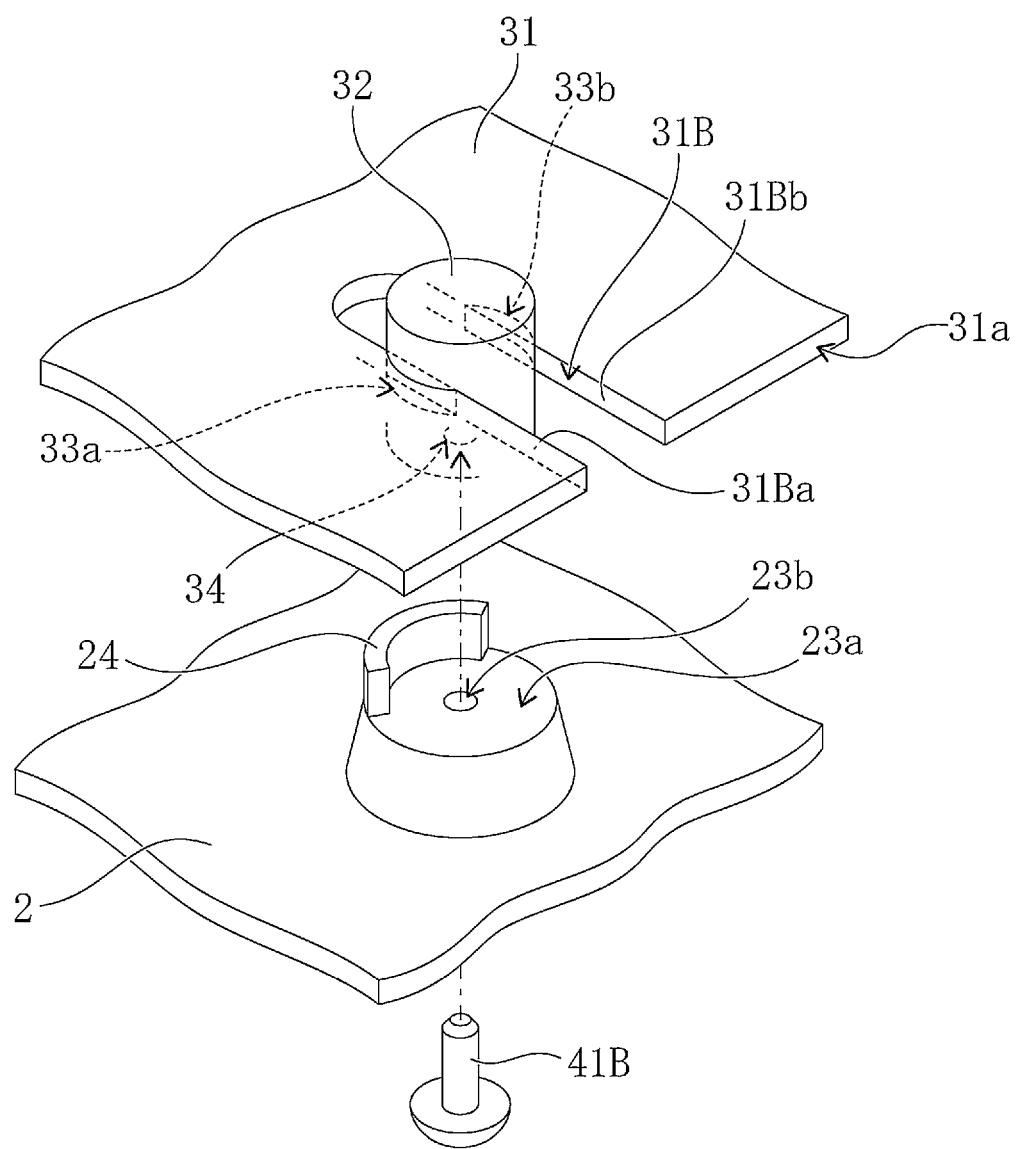
FIG. 5 is an exploded perspective view of another modification of the cover mounting structure according to the first embodiment.

FIG. 5 is an exploded perspective view of another modification of the cover mounting structure 3 according to the first embodiment. As illustrated in FIG. 5, a positioning rib 24 may be formed near a through hole 23b, through which a corresponding one of the screw members 41B is inserted, at an inner surface 2a (specifically, a top surface 23a where the inner surface 2a projects due to formation of a corresponding one of the depressions 21B) of the cover 2. Here, the positioning rib 24 positions the sliding member 32 inserted into the guide slit 31B at such a position that the screw hole 34 and the through hole 23b are aligned with each other.

According to the present modification (FIG. 5), in order to connect the cover 2 (depressions 21B) and the sliding members 32 to one another with the screw members 41B during the assembly of the display device, the screw holes 34 and the respective through holes 23b are able to be aligned with one another only by pressing the sliding members 32 against the respective positioning ribs 24. This increases ease of a connecting task with the screw members 41B. The positioning ribs 24 are also usable for the cover mounting structure 3 illustrated in FIG. 4.

[2] Second Embodiment

[2-1] The Cover Mounting Structure

Figure 6A:
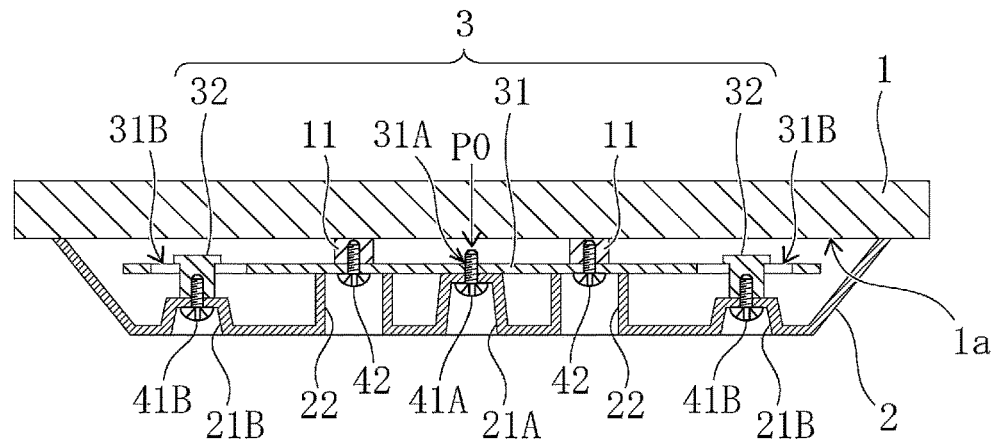
FIG. 6A is a sectional view of the cover mounting structure according to a second embodiment.
Figure 6B:
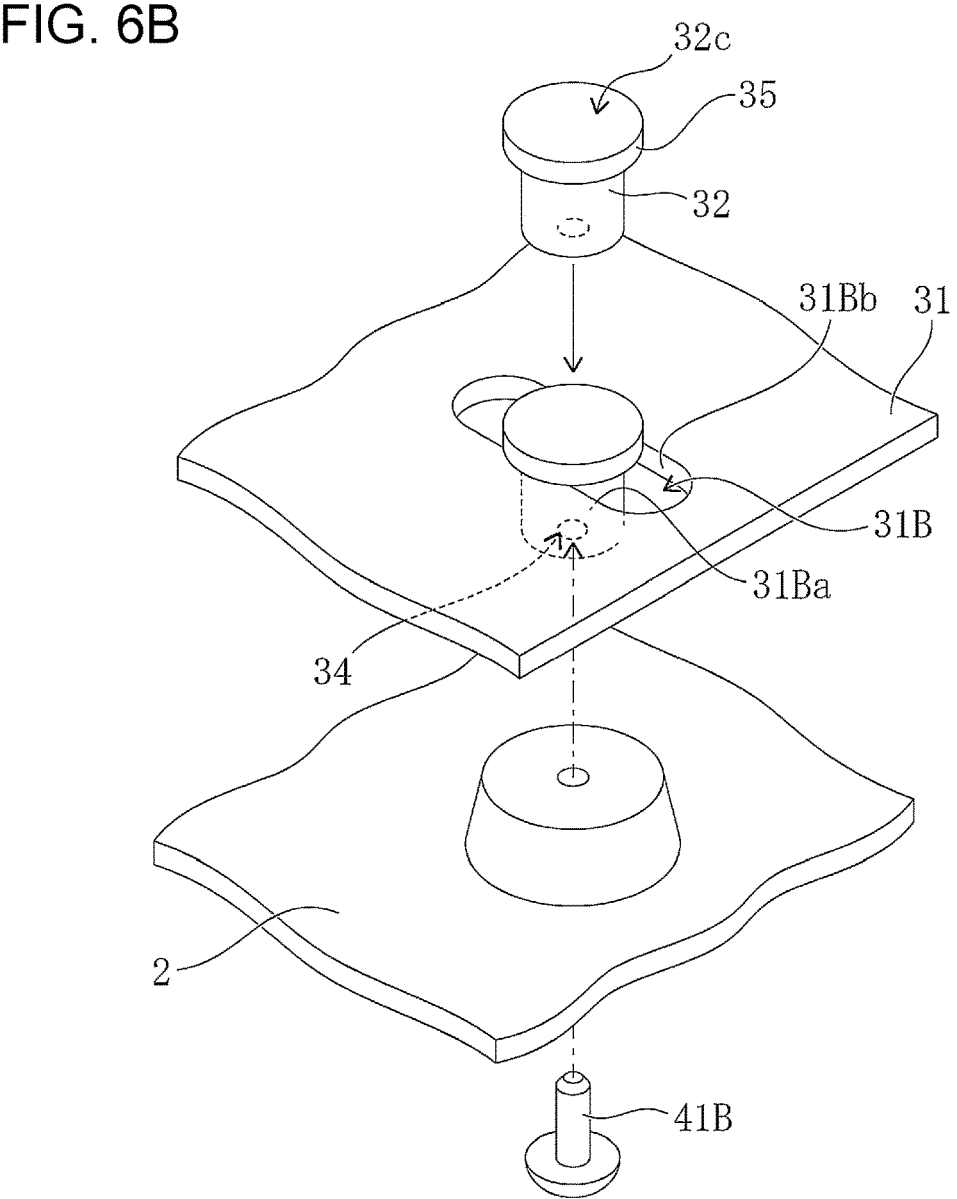
FIG. 6B is an exploded perspective view of part of the cover mounting structure.
Figure 7:
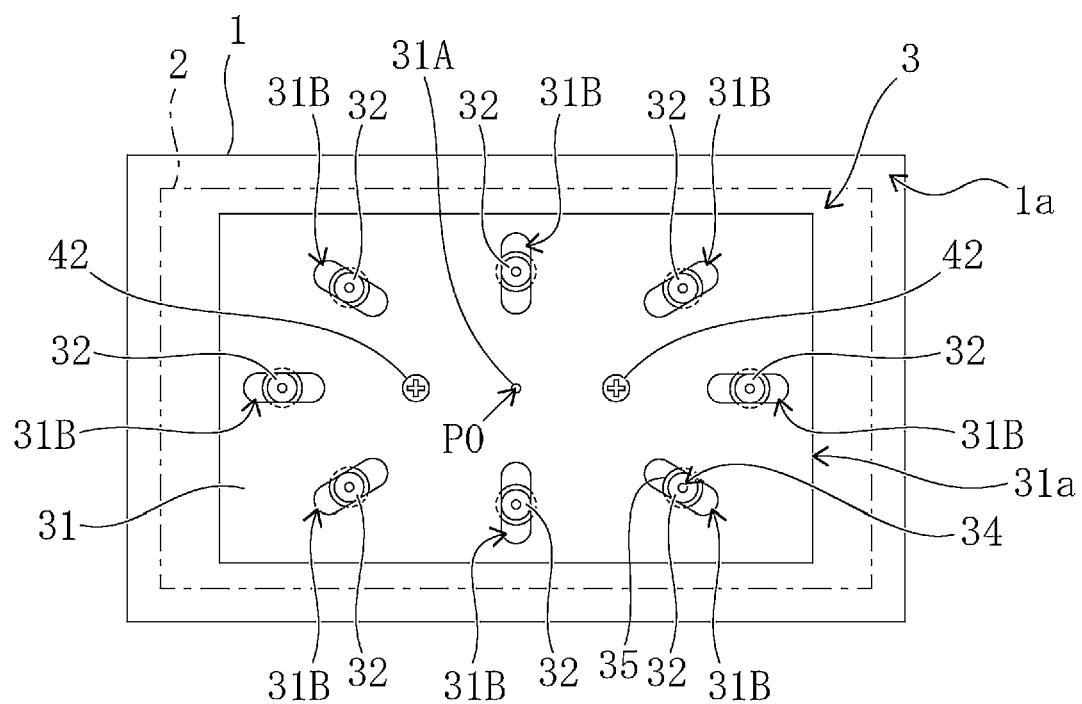
FIG. 7 is a rear view of the display device with the cover omitted, illustrating the cover mounting structure according to the second embodiment.

FIG. 6A is a sectional view of the cover mounting structure 3 according to a second embodiment, and FIG. 6B is an exploded perspective view of part of the cover mounting structure 3. FIG. 7 is a rear view of the display device with the cover 2 omitted. As illustrated in FIGS. 6A and 6B, each of the sliding members 32 has a columnar shape having a slightly smaller width than the width of the guide slits 31B, and a flange-shaped flange portion 35 is formed along an end surface 32c of the sliding member 32 on the opposite side to the cover 2. Here, the flange portion 35 suppresses a movement toward the cover 2 side of the sliding member 32 inserted through the guide slits 31B. During the assembly of the display device, the flange portion 35 is brought into contact with (that is, hooked onto) the pair of edges 31Ba and 31Bb of the guide slit 31B, thereby being brought into engagement with the edges 31Ba and 31Bb.

According to the present embodiment, the guide slit 31B with both the ends closed is suitable (see FIG. 7). The reason for this is that, as has been described, the guide slits 31B are able to be provided not only in the outer peripheral region near the outer periphery 31a of the support member 31 but also at various positions including positions in the central region. According to the present embodiment, since the width of the sliding member 32 other than the flange portion 35 is slightly smaller than the width of the guide slit 31B, other than the guide slit 31B, the insertion hole 31C (see FIG. 4) or the like is able to be omitted.

With the cover mounting structure 3 according to the present embodiment, as is the case with the first embodiment, when the cover 2 expands or contracts due to heat or with time, the sliding members 32 connected to the cover 2 are able to be moved along the guide slits 31B in directions in accordance with the expansion or contraction of the cover 2. Accordingly, stress due to expansion or contraction is unlikely to be caused in the cover 2. As a result, deformation such as warpage is unlikely to be caused in the cover 2. Furthermore, the cover mounting structure 3 is able to be easily made.

[2-2] Modification

Figure 8:
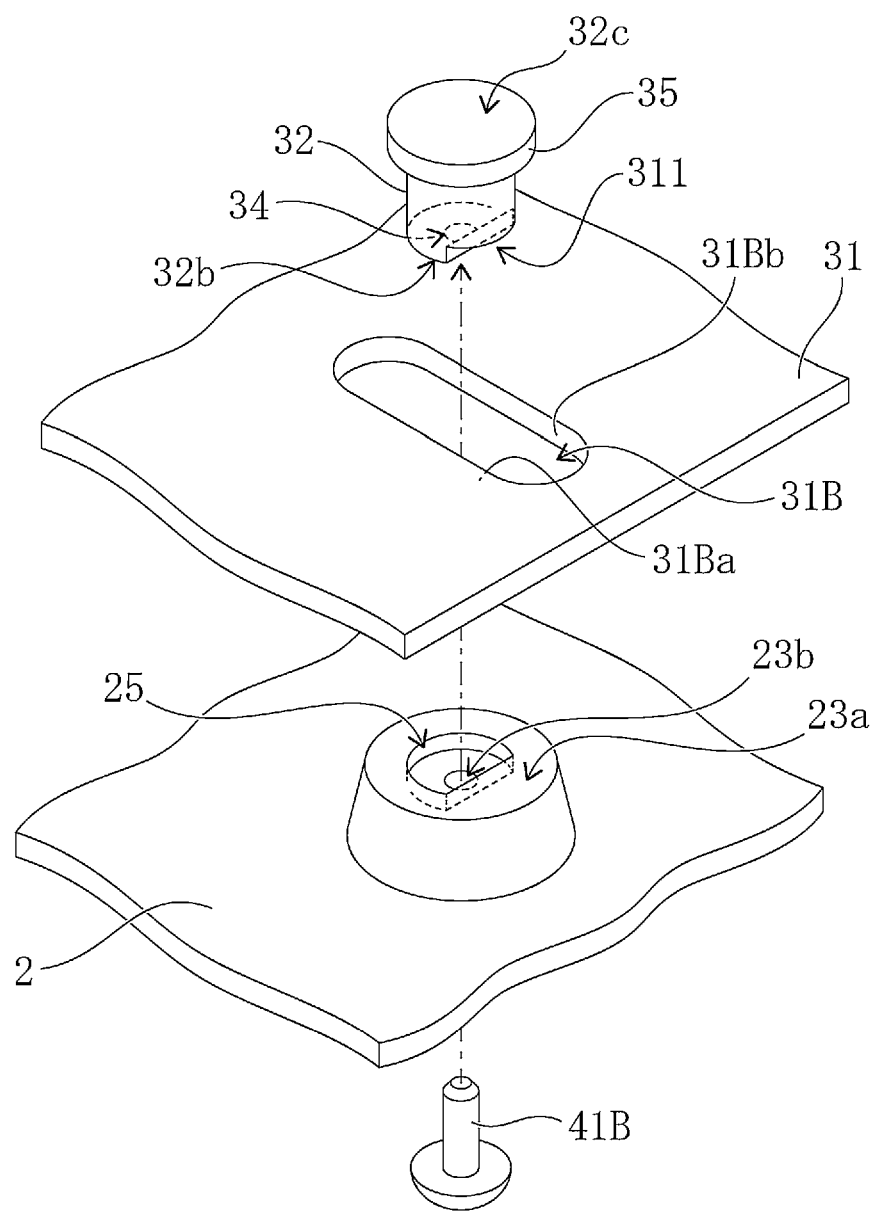
FIG. 8 is an exploded perspective view of a modification of the cover mounting structure according to the second embodiment.

FIG. 8 is an exploded perspective view of a modification of the cover mounting structure 3 according to the second embodiment. As illustrated in FIG. 8, the end surface 32b (the surface in which the screw hole 34 is provided) of the sliding member 32 may have a different outer peripheral shape than a circular shape. In FIG. 8, the sliding member 32 has a columnar shape having a cut 311 in the end surface 32b, thereby the outer peripheral shape of the end surface 32b is changed from a circular shape to a D shape. The outer peripheral shape of the end surface 32b is not limited to the D shape and may be changed to any one of various shapes other than a circular shape.

Furthermore, a positioning groove 25 may be formed in a region of the inner surface 2a (specifically, the top surface 23a where the inner surface 2a projects due to formation of a corresponding one of the depressions 21B) of the cover 2 that faces, when the screw hole 34 and the through hole 23b are aligned with each other, the end surface 32b. Here, the positioning groove 25 positions the sliding member 32 inserted into the guide slit 31B at such a position that the screw hole 34 and the through hole 23b are aligned with each other. Specifically, the screw hole 34 and the through hole 23b are able to be aligned with each other by fitting an end portion of the sliding member 32 having a D-shaped section into the positioning groove 25.

According to the present modification (FIG. 8), in order to connect the cover 2 (depressions 21B) and the sliding members 32 to one another with the screw members 41B during the assembly of the display device, the screw holes 34 and the respective through holes 23b are able to be aligned with one another only by fitting the above-described end portions of the sliding members 32 into the respective positioning grooves 25.

Furthermore, since the end portions of the sliding members 32 and the respective positioning grooves 25 are mutually fitted with their D-shaped structures, the sliding members 32 do not rotate (do not rotate about their axes) when the screw members 41B are screwed into the screw holes 34. That is, due to fitting of the end portions of the sliding members 32 and the respective positioning grooves 25, the end portions of the sliding members 32 and the positioning grooves 25 function as rotation stoppers for the sliding members 32. This increases ease of the connecting task with the screw members 41B.

[3] Third Embodiment

Figure 9:
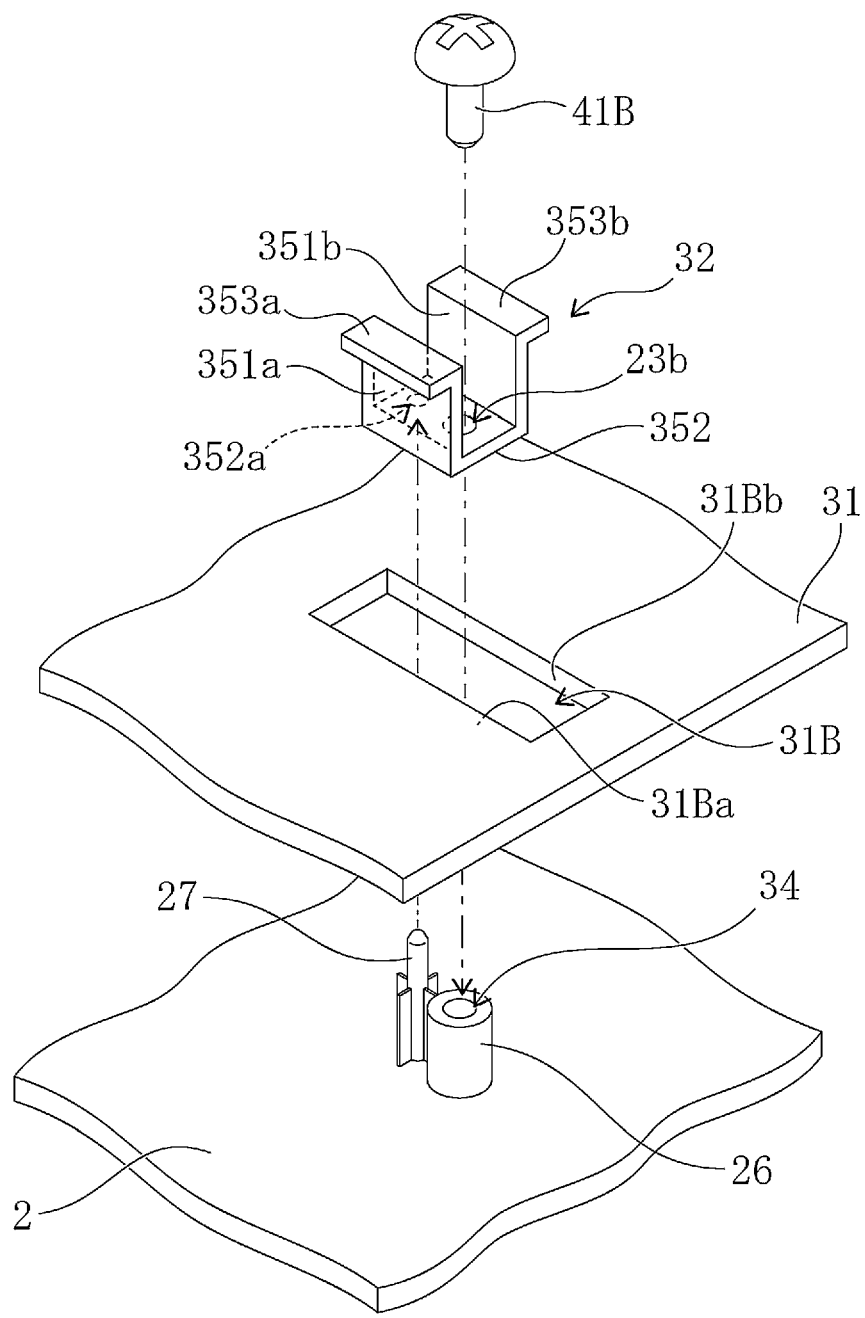
FIG. 9 is an exploded perspective view of part of the cover mounting structure according to a third embodiment.

FIG. 9 is an exploded perspective view of part of the cover mounting structure 3 according to a third embodiment. As illustrated in FIG. 9, each of the sliding members 32 includes a pair of facing flat portions 351a and 351b inserted through a corresponding one of the guide slits 31B, a connecting flat portion 352 that connects end portions of the facing flat portions 351a and 351b to each other on the cover 2 side, and a pair of flange portions 353a and 353b. Such a sliding member 32 is able to be formed by, for example, bending a single flat metal plate.

The pair of flange portions 353a and 353b are formed at end portions of the respective facing flat portions 351a and 351b on the opposite side to the cover 2 so as to extend from the facing flat portions 351a and 351b on the pair of edges 31Ba and 31Bb of the guide slit 31B. Accordingly, the flange portions 353a and 353b suppress a movement toward the cover 2 side of the sliding member 32 inserted through the guide slits 31B. During the assembly of the display device, the flange portions 353a and 353b are brought into contact with (that is, hooked onto) the pair of edges 31Ba and 31Bb of the guide slit 31B, thereby being brought into engagement with the edges 31Ba and 31Bb.

Furthermore, according to the present embodiment, the through hole 23b through which the screw member 41B is inserted is formed in the connecting flat portion 352 of the sliding member 32. Also, the screw hole 34 into which the screw member 41B is screwed is provided in a corresponding one of bosses 26 formed on the inner surface 2a of the cover 2.

Furthermore, according to the present embodiment, a positioning pin 27 is formed near the boss 26. Also, a second through hole 352a is formed in the connecting flat portion 352 of the sliding member 32 so as to face the positioning pin 27 when the screw hole 34 and the through hole 23b are aligned with each other. With the positioning pins 27, in order to connect the cover 2 (depressions 21B) and the sliding members 32 to one another with the screw members 41B during the assembly of the display device, the screw holes 34 and the respective through holes 23b are able to be aligned with one another only by inserting the positioning pins 27 respectively into the second through holes 352a provided in the sliding members 32.

With the above-described structure, according to the present embodiment, the cover 2 (bosses 26) and the sliding members 32 are connected to one another with the screw members 41B from an inner side of the cover 2. Specifically, the screw members 41B are screwed into the respective screw holes 34 through the through holes 23b provided in the sliding members 32 from the inner side of the cover 2. When the connection with the screw members 41B is able to be performed from the inner side of the cover 2 as described above, an insertion direction of the sliding members 32 into the guide slits 31B is coincident with an insertion direction of the screw members 41B. That is, insertion of the sliding members 32 into the guide slits 31B and insertion of the screw members 41B are able to be performed from the same side of the cover 2.

Furthermore, the positioning pins 27 are inserted into the second through hole 352a during the assembly of the display device. Accordingly, the sliding members 32 do not rotate (do not rotate about their axes) when the screw members 41B are screwed into the screw holes 34. That is, the second through holes 352a and the positioning pins 27 engaged with one another function as rotation stoppers for the sliding members 32. This increases ease of the connecting task with the screw members 41B.

Furthermore, with the cover mounting structure 3 according to the present embodiment, as is the case with the first embodiment, when the cover 2 expands or contracts due to heat or with time, the sliding members 32 connected to the cover 2 are able to be moved along the guide slits 31B in directions in accordance with the expansion or contraction of the cover 2. Accordingly, stress due to expansion or contraction is unlikely to be caused in the cover 2. As a result, deformation such as warpage is unlikely to be caused in the cover 2. Furthermore, the cover mounting structure 3 is able to be easily made.

[4] Other Embodiments

Figure 10:
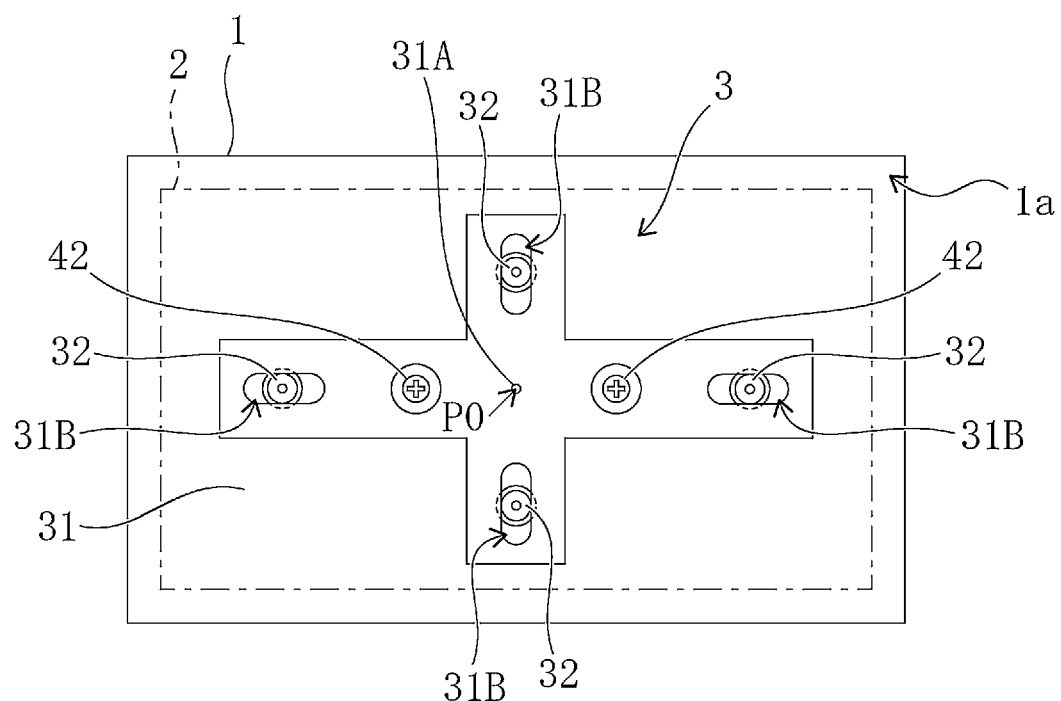
FIG. 10 is a rear view of the display device with the cover omitted, illustrating the cover mounting structure according to another embodiment.

FIG. 10 is a rear view of the display device with the cover 2 omitted, illustrating the cover mounting structure 3 according to another embodiment. As illustrated in FIG. 10, the shape of the flat plate used for the support member 31 is not limited to a rectangular shape. A flat plate having any one of various shapes such as a crisscross and so forth may be used for the support member.

The support member 31 of any one of the various cover mounting structures 3 may be divided into two or more pieces. Also, the cover 2 may be divided into two or more pieces. In the case where the cover 2 is divided into two or more pieces, securing positions P0 are set for the respective pieces of the cover 2. Furthermore, the securing position P0 (securing positions P0 for divided cover pieces in the case where the cover 2 is divided into two or more pieces) where the cover 2 is secured to the support member 31 is not limited to a single central position. The securing position P0 may be set at any of various positions.

The shape of the guide slits 31B of the above-described cover mounting structure 3 may be changed to any one of shapes of various guide portions that define the sliding-member-32 moving directions D1 while allowing the sliding members 32 to be slidable relative the support member 31. Furthermore, despite the above description in which eight of the guide portions and eight of the corresponding sliding members are provided, the numbers of guide portions and sliding members are not limited to eight and may be appropriately changed in accordance with, for example, the size of the display panel 1 or the cover 2. Furthermore, despite the above description in which two of the bosses 11 are provided in the rear surface 1a of the display panel 1, the number of bosses 11 is not limited to two and may be appropriately changed in accordance with, for example, the size of the display panel 1 or the cover 2.

It should be understood that the above description of the embodiments is exemplary and not limiting in any sense. The scope of the present disclosure is defined not by the above-described embodiments but by the claims. In addition, it is intended that any change within the meaning and the scope equivalent to the claims is included in the scope of the present disclosure.

The present disclosure contains subject matter related to that disclosed in Japanese Priority Patent Application JP 2017-055499 filed in the Japan Patent Office on Mar. 22, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A cover mounting structure,
   wherein the cover mounting structure is configured to mount a cover to a covering target to be covered with the cover,
   wherein the cover mounting structure includes
      a support member that is configured to be secured to the covering target and that supports the cover, and
      a sliding member prepared separately from the cover and provided so as to be slidable relative to the support member,
   wherein the cover is secured to the support member at a prescribed securing position and connected to the sliding member at a different position from the prescribed securing position,
   wherein at least one guide portion that defines a moving direction of the sliding member is provided in the support member, and
   wherein the at least one guide portion defines the moving direction as a radial direction from the prescribed securing position as a center.

2. The cover mounting structure according to claim 1,
   wherein the at least one guide portion is a guide slit extending in the moving direction, and
   wherein an engagement portion slidably engaged with an edge portion of the guide slit is provided in the sliding member.

3. The cover mounting structure according to claim 1,
   wherein, in the support member, the at least one guide portion includes a plurality of guide portions, and
   wherein the plurality of guide portions radially extends from the prescribed securing position as a center.

4. A display device comprising:
   a display panel;
   and
   the cover mounting structure according to claim 1 used for mounting of the cover on a rear surface of the display panel so that the cover covers the rear surface of the display panel.

* * * * *